United States Patent
Jiang et al.

(10) Patent No.: US 10,353,846 B2
(45) Date of Patent: Jul. 16, 2019

(54) COMMUNICATION SYSTEM WITH TRAIN BUS ARCHITECTURE

(71) Applicant: VIEWMOVE TECHNOLOGIES, INC., Pingzhen (TW)

(72) Inventors: Shyh-Biau Jiang, Pingzhen (TW); Li-Yeh Liu, Pingzhen (TW); Dong-Liang Lee, Pingzhen (TW); Chuan-Fu Huang, Pingzhen (TW); Yun-Sheng Hsiao, Pingzhen (TW)

(73) Assignee: VIEWMOVE TECHNOLOGIES, INC., Pingzhen (TW)

( * ) Notice: Subject to any disclaimer, the term of this patent is extended or adjusted under 35 U.S.C. 154(b) by 518 days.

(21) Appl. No.: 15/071,820

(22) Filed: Mar. 16, 2016

(65) Prior Publication Data
US 2017/0177533 A1  Jun. 22, 2017

(30) Foreign Application Priority Data
Dec. 21, 2015 (TW) .............................. 104143017 A

(51) Int. Cl.
*G06F 13/40* (2006.01)
*G06F 13/36* (2006.01)
(Continued)

(52) U.S. Cl.
CPC .......... *G06F 13/4068* (2013.01); *G06F 13/36* (2013.01); *G06F 13/37* (2013.01); *G06F 13/4247* (2013.01); *H04L 49/102* (2013.01)

(58) Field of Classification Search
None
See application file for complete search history.

(56) References Cited

U.S. PATENT DOCUMENTS 5,361,260 A * 11/1994 Mito ..................... H04L 12/423
                                                     318/41
6,658,509 B1 * 12/2003 Bonella ............... G06F 13/1684
                                                     370/223
(Continued)

FOREIGN PATENT DOCUMENTS

CN      100588169 C    2/2010
CN      103078777 A    5/2013

OTHER PUBLICATIONS

'EtherCAT—The Ethernet Fieldbus' by EtherCAT Technology Group, 2009.*
(Continued)

*Primary Examiner* — Steven G Snyder
(74) *Attorney, Agent, or Firm* — Osha Liang LLP

(57) ABSTRACT

A communication system with train bus architecture is described. The communication system with the train bus architecture comprises a coupling device for transmitting a first instruction packet string having instruction packets via first path; the controlled module for receiving the first instruction packet string via first path, wherein the controlled module selects one instruction packet from the instruction packets, replaces the selected instruction packet by first response packet for forming second instruction packet string, and processes the selected instruction packet to generate a second response packet; and a terminal device for receiving the second instruction packet string via the first path, and for transmitting the second instruction packet string back to the coupling device via the at least one controlled module along a second path from the terminal device to the coupling device wherein the first path is connected to the second path to form train bus architecture.

14 Claims, 4 Drawing Sheets

(51) Int. Cl.
*H04L 12/933* (2013.01)
*G06F 13/42* (2006.01)
*G06F 13/37* (2006.01)

(56) References Cited

U.S. PATENT DOCUMENTS

| | | | | |
|---|---|---|---|---|
| 6,680,904 | B1* | 1/2004 | Kaplan | H04L 12/56 |
| | | | | 370/217 |
| 6,747,887 | B2* | 6/2004 | Halbert | G11C 5/02 |
| | | | | 365/51 |
| 6,763,426 | B1* | 7/2004 | James | G11C 15/00 |
| | | | | 365/49.17 |
| 6,963,944 | B1* | 11/2005 | Rettig | H04L 12/403 |
| | | | | 710/105 |
| 7,009,973 | B2* | 3/2006 | Cao | H04L 49/102 |
| | | | | 370/392 |
| 7,093,076 | B2* | 8/2006 | Kyung | G06F 13/4234 |
| | | | | 365/51 |
| 7,308,524 | B2* | 12/2007 | Grundy | G06F 12/06 |
| | | | | 711/103 |
| 7,836,340 | B2* | 11/2010 | Schuetz | G06F 11/004 |
| | | | | 714/25 |
| 7,957,173 | B2* | 6/2011 | Kim | G11C 5/02 |
| | | | | 365/191 |
| 8,122,202 | B2* | 2/2012 | Gillingham | G06F 13/1678 |
| | | | | 711/149 |
| 8,134,852 | B2* | 3/2012 | Kim | G06F 13/4234 |
| | | | | 365/191 |
| 8,335,868 | B2* | 12/2012 | Pyeon | G06F 13/4291 |
| | | | | 710/8 |
| 8,531,942 | B2 | 9/2013 | Buttner et al. | |
| 8,825,939 | B2* | 9/2014 | Oh | G06F 13/4239 |
| | | | | 365/185.18 |
| 9,996,496 | B2* | 6/2018 | Rivers | G06F 13/385 |
| 2001/0033571 | A1* | 10/2001 | Cao | H04L 49/102 |
| | | | | 370/392 |
| 2004/0001380 | A1* | 1/2004 | Becca | G06F 13/18 |
| | | | | 365/202 |
| 2004/0117569 | A1* | 6/2004 | Kyung | G06F 13/4234 |
| | | | | 711/154 |
| 2007/0076502 | A1* | 4/2007 | Pyeon | G11C 5/066 |
| | | | | 365/221 |
| 2007/0233917 | A1* | 10/2007 | Pyeon | G06F 13/4291 |
| | | | | 710/100 |
| 2008/0168296 | A1* | 7/2008 | Oh | G06F 13/1689 |
| | | | | 713/401 |
| 2009/0222606 | A1 | 9/2009 | Janssen et al. | |
| 2010/0030951 | A1* | 2/2010 | Kim | G06F 13/1684 |
| | | | | 711/103 |
| 2010/0185841 | A1* | 7/2010 | Monreal | G06F 13/37 |
| | | | | 713/2 |
| 2017/0308487 | A1* | 10/2017 | Oda | G06F 13/42 |
| 2017/0351637 | A1* | 12/2017 | Rivers | G06F 13/385 |
| 2018/0329854 | A1* | 11/2018 | Rivers | G06F 13/385 |

OTHER PUBLICATIONS

'EtherCAT Technical Introduction and Overview' by EtherCAT Technology Group, Dec. 2004.*

* cited by examiner

COMMUNICATION SYSTEM WITH TRAIN BUS ARCHITECTURE

BACKGROUND OF THE INVENTION

Field of Invention

The present invention relates to a communication system, and more particularly to a communication system with a train bus architecture.

Description of Prior Art

Conventionally, due to the increased demand for product manufacturing process, an automation technology is widely used in a production process and the automation technology usually employs a plurality of serially connected input/output (I/O) modules to transmit a packet serial having data packets wherein a master/slave structure is used to transmit and process the packet serial with the data packets, which are forwarded to the I/O modules, by a serial bus interface protocol. In U.S. Pat. No. 8,531,942, entitled "COMMUNICATION SYSTEM HAVING A MASTER/SLAVE STRUCTURE", which is filed on May 20, 2009, FIGS. 1A and 1B are schematic views of a communication system comprising a master-slave structure. Similarly, FIG. 1 is a schematic block diagram of conventional communication system with a master-slave structure. The transmitter unit TX of the control unit 13 in the primary unit 1 sequentially transmits the data packets to the first slave unit 3 (1) like an I/O module. The receiving unit RX1 of each slave unit 3 sequentially receives all the packets from the previous slave unit 3 wherein a processing unit 35 of a current slave unit 3 processes the packets, which belongs to the current slave unit 13, and the rest of data packets, which do not belong to the current slave unit 13, are forwarded to the next slave unit 3 by the transmitter unit TX1 of the current slave unit 13. After the last slave unit 3(N), i.e. stage "N", transmits the rest of data packets to the receiving unit RX1 (not shown) of the central unit 20, the transmitter unit TX2 (not shown) of the central unit 20 transmits the rest of data packets back to the receiving unit RX2 of the last slave unit 3. Afterwards, the last slave unit 3(N), i.e. stage "N", transmits the rest of data packets back to the previous slave unit 3, i.e. stage "N−1" (not shown), using the transmitter unit TX2, and the last slave unit 3, i.e. stage "N", replaces a portion of the rest of data packets, which belongs to the slave unit 3, with the processed packet in the last slave unit 3 in a return path from the central unit 20 to the primary unit 1. Similarly, the transmitter unit TX2 of the slave unit 3, i.e. stage "N−1", then transmits the collected packets to the previous slave unit 3, i.e. stage "N−2" (not shown), until the data packets in the return path are sent to the first slave unit 3. Finally, the primary unit 1 receives the processed packets of each slave unit 3.

However, the above-mentioned system requires two sets of transmitter units, i.e. TX1 and TX2 and two sets of receiving units, i.e. RX1 and RX2, to be installed in each slave unit 3 therein, thereby resulting in higher manufacturing cost of the system. Particularly, when the amount of the I/O modules is increased for the purpose of more and more manufacture processing nodes or stations, the quantity of the transmitter units and the receiving units will be considerably raised to increase the production cost. Furthermore, the response packets are inserted to the packet serial during the backward process, i.e. a returned procedure, from the central unit 20 to the control unit 13 via last slave unit 3(N) to first slave unit 3(1) and thus the response packets are not inserted to the packet serial during a forward process from the control unit 13 to the central unit 20 via first slave unit 3(1) to last slave unit 3(N), which results in the decreased transmission efficiency of the data packets. Consequently, there is a need to develop a communication system to solve the aforementioned problems.

SUMMARY OF THE INVENTION

One objective of the present invention is to provide a communication system with the train bus architecture to economize the installation of the transmission units and receiving units of the controlled module for saving the manufacturing cost of the communication system when the control unit of the controlled module controls the train bus architecture.

Another objective of the present invention is to provide a communication system with the train bus architecture to increase the efficiency of the data transmission when the train bus architecture rapidly sends the instruction packets and response packets.

According to the above objectives, the present invention sets forth a communication system with train bus architecture. The communication system with train bus architecture comprises a coupling device, for transmitting a first instruction packet string via a first path wherein the first instruction packet string comprises a plurality of instruction packets; at least one controlled module connected to the coupling device, for receiving the first instruction packet string via the first path, wherein the at least one controlled module selects one instruction packet corresponding to the at least one controlled module from the instruction packets of the first instruction packet string, replaces the selected instruction packet by a first response packet in the at least one controlled module for forming a second instruction packet string, and processes the selected instruction packet to generate a second response packet; and a terminal device connected to the at least one controlled module, for receiving the second instruction packet string comprising the first response packet, the second response packet, and/or the instruction packets which does not correspond to the at least one controlled module via the first path from the coupling device to the terminal device, and for transmitting the second instruction packet string back to the coupling device via the at least one controlled module along a second path from the terminal device to the coupling device, wherein the first path is connected to the second path to form the train bus architecture.

In one embodiment, the coupling device comprises a transmitting interface, for transmitting the first instruction packet string to the at least one controlled module via the first path; and a host connected to the transmitting interface, for receiving the second instruction packet string from the at least one controlled module via the second path.

In one embodiment, the at least one controlled module is composed of one controlled module and the controlled module comprises a receiving unit connected to the coupling device, for receiving the first instruction packet string of the coupling device via the first path; a control unit connected to the receiving unit, for replacing the selected instruction packet corresponding to the controlled module by the first response packet; a transmitting unit connected to the control unit of the controlled module and the receiving unit of a next controlled module respectively, for transmitting the second instruction packet string from the controlled module to the next controlled module via the first path; and a first buffer connected to the next controlled module and the coupling device, for storing the second instruction packet string from the terminal device via the second path.

In one embodiment, the at least one controlled module is composed of a plurality of controlled modules and each controlled module comprises a receiving unit connected to a prior controlled module, for receiving the second instruction packet string of the prior controlled module via the first path; a control unit connected to the receiving unit, for replacing the selected instruction packet corresponding to a current controlled module by the first response packet; a transmitting unit connected to the control unit of the current controlled module and the receiving unit of a next controlled module respectively, for transmitting the second instruction packet string from the current controlled module to the next controlled module via the first path; and a first buffer connected to the next controlled module and the prior controlled module, for storing the second instruction packet string from the terminal device via the second path.

In one embodiment, the terminal device receives each first response packet of each controlled modules via the first path and the coupling device receives the second instruction packet string with the first response packets of each controlled module from the terminal device via the second path.

In one embodiment, the control unit further comprises an instruction buffer connected to the receiving unit in the current controlled module; and an application program module connected to the instruction buffer and the receiving unit, for detecting the first instruction packet string or the second instruction packet string, wherein when an indication number of the instruction packet in the first instruction packet string or the second instruction packet string corresponds to the current controlled module, the application program module copies the indicated instruction packet to the instruction buffer and replaces the indicated instruction packets in the first instruction packet string or the second instruction packet string by the first response packet with the indication number.

In one embodiment, when the indication number of the instruction packet in the first instruction packet string or the second instruction packet string does not correspond to the current controlled module, the application program module transmits the non-corresponding instruction packets forward to the receiving unit of the next controlled module.

In one embodiment, the control unit further comprises a result buffer connected to the application program module and the transmitting unit in the current controlled module, the application program module acquires and processes the corresponding instruction packets within the instruction buffer in a predetermined duration for forming the first response packet of the current controlled module and for storing the first response packets in the result buffer.

In one embodiment, the at least one controlled module is composed of one controlled module and the controlled module comprises a receiving unit connected to a prior controlled module, for receiving the second instruction packet string of the prior controlled module via the first path; a control unit connected to the receiving unit, for replacing the selected instruction packet corresponding to the controlled module by the first response packet; a transmitting unit connected to the control unit of the current controlled module and the terminal device respectively, for transmitting the second instruction packet string from the controlled module to the terminal device via the first path; and a first buffer connected to the terminal device and the prior controlled module, for storing the second instruction packet string from the terminal device via the second path.

In one embodiment, the terminal device comprises a second buffer for storing the first response packets of the second instruction packet string from the at least one controlled module.

In one embodiment, the coupling device transmits a first serial detecting packet via the first path and the first serial detecting packet comprises a head packet followed by a plurality of encoding packets.

In one embodiment, when the controlled module identifies the head packet of the first serial detecting packet, a counter of the controlled module is capable of counting the packets in the first serial detecting packet until the controlled module figures out a position of the first encoding packet to allow the controlled module to generate a counting number of the first encoding packet and the counting number represents a number of the controlled module.

In one embodiment, the at least one controlled module replaces the first encoding packet by a reporting packet for forming a second serial detecting packet and the second serial detecting packet is transmitted to the terminal device.

In one embodiment, the coupling device receives the second serial detecting packet from the terminal device to compute an amount of the at least one controlled module and to identify a characteristic of the controlled module based on the reporting packet.

In one embodiment, a transmission time of the first instruction packet string from the coupling device to the terminal device via the first path is greater than a transmission time of the second instruction packet string from the terminal device to the coupling device via the second path.

DETAILED DESCRIPTION OF THE PREFERRED EMBODIMENTS

Figure 1:
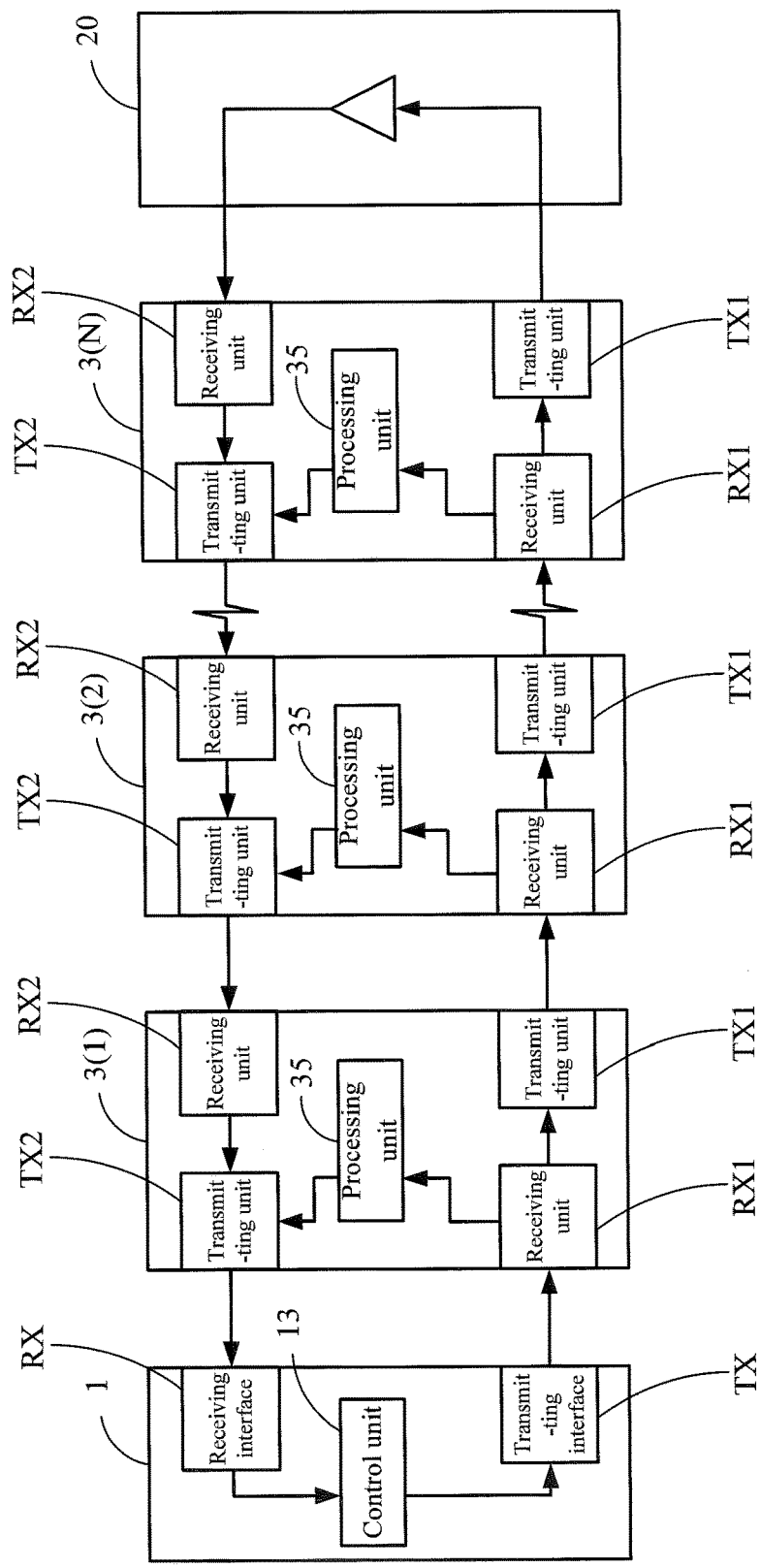
FIG. 1 is a schematic block diagram of conventional communication system with a master-slave structure.
Figure 2:
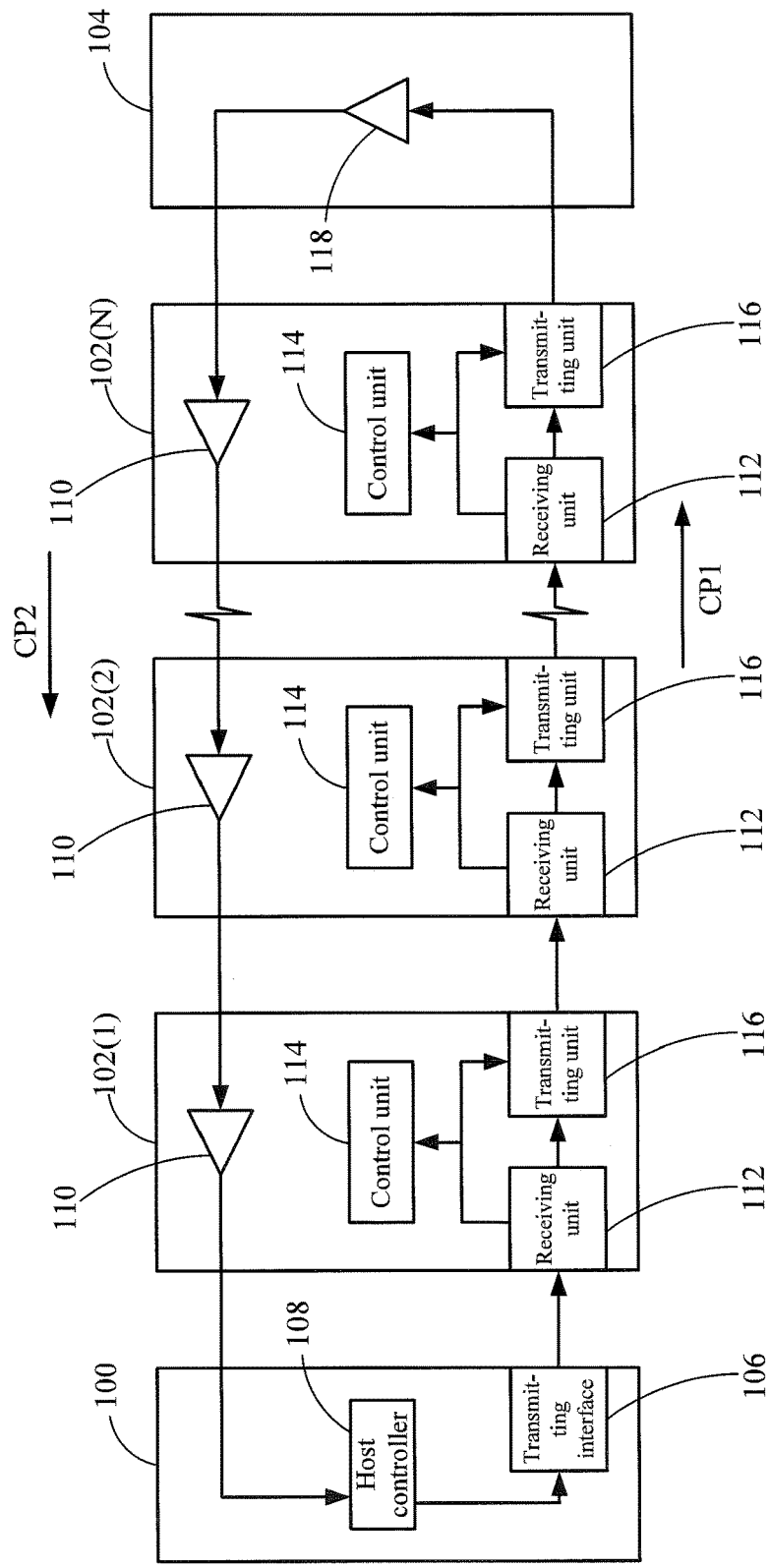
FIG. 2 is a schematic block diagram of communication system with a train bus architecture according to one embodiment of the present invention.

Referring to FIG. 2, which is a schematic block diagram of communication system with a train bus architecture according to one embodiment of the present invention. The communication system comprises a coupling device 100, at least one controlled module 102 and a terminal device 104. The at least one controlled module 102 is connected to the coupling device 100 and the terminal device 104 respectively wherein the at least one controlled module 102 is disposed between the coupling device 100 and the terminal device 104. In FIG. 2, the amount "N" of the controlled modules 102 are serially disposed between the coupling device 100 and the terminal device 104.

The coupling device 100 transmits a first instruction packet string, e.g. a packet serial, via a first path CP1 from the coupling device 100 to the terminal device 104 wherein the first instruction packet string comprises a plurality of instruction packets. In one embodiment, the coupling device 100 comprises a transmitting interface 106 and a host controller 108 connected to the transmitting interface 106. The transmitting interface 106 transmits the first instruction packet string to the at least one controlled module 102 via the first path CP1. The host controller 108 of the coupling device 100 receives the second instruction packet string from the at least one controlled module 102 via the second path CP2 from the terminal device 104 to the coupling device 100. Specifically, the first path CP1 is defined as a data transmission path from the coupling device 100 to the terminal device 104 via the controlled modules 102, and the second path CP2 is defined as a data transmission path from the terminal device 104 to the coupling device 100 via the controlled modules 102.

The at least one controlled module 102 connected to the coupling device 100 receives the first instruction packet string via the first path CP1. The at least one controlled module 102 selects and acquires one instruction packet, which is corresponding to the at least one controlled module 102, from the instruction packets of the first instruction packet string. Afterward, the controlled module 102 replaces the selected instruction packet by a first response packet for forming a second instruction packet string. In one case, the first response packet originally stored in the controlled module 102 is inserted to the first instruction packet string to be combined with the first instruction packet string to form the second instruction packet string. The controlled module 102 processes the selected instruction packet to generate a second response packet. In another case, the first and second response packets are inserted to the first instruction packet string to form the second instruction packet string after the corresponding instruction packet is selected. In other words, the first and second response packets of each controlled module 102 are generated in a current or previous transmission procedure of the train bus architecture. Preferably, the first instruction packet string (an input end of the controlled module 102) is a packet string before inserting the response packet and the second instruction packet string (an output end of the controlled module 102) is a packet string after inserting the response packet in a predetermined controlled module 102.

The terminal device 104 connected to the last controlled module 102, e.g. stage "N", receives the second instruction packet string wherein the second instruction packet string comprises the first response packet, the second response packet and/or the instruction packets which are not corresponding to the at least one controlled module 102 via the first path CP1. The terminal device 104 transmits the second instruction packet string back to the coupling device 100 via the controlled modules 102 along a second path CP2, wherein the first path CP1 is serially connected to the second path CP2 to form the train bus architecture. In one embodiment, the terminal device 104 comprises a second buffer 118 for storing the first response packet, the second response packet and/or the non-corresponding instruction packets of the second instruction packet string from the controlled modules 102. The terminal device 104 receives the first response packets of the controlled modules 102 via the first path CP1 and the coupling device 100 receives the second instruction packet string with the first response packets from each controlled module 102 via the second path CP2.

Specifically, the first controlled module 102(1) in FIG. 2 comprises a receiving unit 112, a control unit 114, a transmitting unit 116 and a first buffer 110. The receiving unit 112 connected to the coupling device 100 receives the first instruction packet string of the coupling device 100 via the first path CP1. The control unit 114 connected to the receiving unit 112 is use to replace the selected instruction packet corresponding to a current controlled module 102(1) by the first response packet so that the selected instruction packet is acquired from the first instruction packet string and the first response packet is inserted to first instruction packet string. The transmitting unit 116 connected to the control unit 114 of the current controlled module 102(1) and the receiving unit 112 of a next controlled module 102(2) respectively transmits the second instruction packet string from the current controlled module 102(1) to the next controlled module 102(2) via the first path CP1. The first buffer 110 connected to the next controlled module 102(1) and the coupling device 100 is capable of storing the second instruction packet string from the terminal device 104 via the second path CP2.

Each of the controlled modules 102(2) through 102(N−1) comprises a receiving unit 112, a control unit 114, a transmitting unit 116 a first buffer 110. The receiving unit 112 connected to a prior controlled module 102 (one of controlled modules 102(1) through 102(N−2) correspondingly) receives the second instruction packet string of the prior controlled module 102 (one of controlled modules 102(1) through 102(N−2) correspondingly) via the first path CP1. The control unit 114 connected to the receiving unit 112 replaces the selected instruction packet corresponding to a current controlled module (one of controlled modules 102(2) through 102(N−1) correspondingly) by the first response packet so that the selected instruction packet is acquired from the first instruction packet string and the first response packet is inserted to first instruction packet string. The transmitting unit 116 connected to the control unit 114 of the current controlled module (one of controlled modules 102(2) through 102(N−1) correspondingly) and the receiving unit 112 of a next controlled modules (one of controlled modules 102(3) through 102(N) correspondingly) respectively transmits the second instruction packet string from the current controlled module (one of controlled modules 102(2) through 102(N−1) to the next controlled module (one of controlled modules 102(3) through 102(N) correspondingly) via the first path CP1. The first buffer 110 connected to the next controlled module (one of controlled modules 102(3) through 102(N) correspondingly) and the prior controlled module (one of controlled modules 102(1) through 102(N−2) correspondingly) stores the second instruction packet string from the terminal device 104 via the second path CP2.

The last controlled module 102(N) in FIG. 2 comprises a receiving unit 112, a control unit 114, a transmitting unit 116 and a first buffer 110. The receiving unit 112 connected to a prior controlled module 102(N−1) receives the second instruction packet string of the prior controlled module 102(N−1) via the first path CP1. The control unit 114 connected to the receiving unit 112 is capable of replacing the selected instruction packet corresponding to a current controlled module 102 (N) by the first response packet so that the selected instruction packet is acquired from the first instruction packet string and the first response packet is inserted to first instruction packet string. The transmitting unit 116 connected to the control unit 114 of the current controlled module 102(N) and the terminal device 104 respectively is used to transmit the second instruction packet string from the current controlled module 102(N) to the terminal device 104. The first buffer 110 connected to the terminal device 104 and the prior controlled module 102 (N−1) stores the second instruction packet string from the terminal device 104. In one embodiment, a transmission time of the first instruction packet string from the coupling device 100 to the terminal device 104 via the first path CP1 is greater than a transmission time of the second instruction packet string from the terminal device 104 to the coupling device 100 via the second path CP2. Thus, the communication system with the train bus architecture employs the transmission time difference between the first path CP1 and the second path CP2 to increase the efficiency of the data transmission when the train bus architecture rapidly sends the instruction packets and response packets. Specifically, the time delay between two first buffers 110 of two adjacent controlled module 102 along the second path CP2 are minimized since the receiving unit 112 and the transmitting unit 116 of each first buffer 110 is omitted advantageously so that the data packets are directly inputted to each first buffer 110 and outputted from each first buffer 110. Similarly, the time delay between two control units 114 of two adjacent controlled module 102 along the first path CP1 are decreased since the controlled module 102 rapidly selects and acquires one instruction packet corresponding to the controlled module 102 from the first instruction packet string and a first response packet and/or second response packet is quickly inserted to the second instruction packet string to form the second instruction packet string for transmission.

Figure 3:
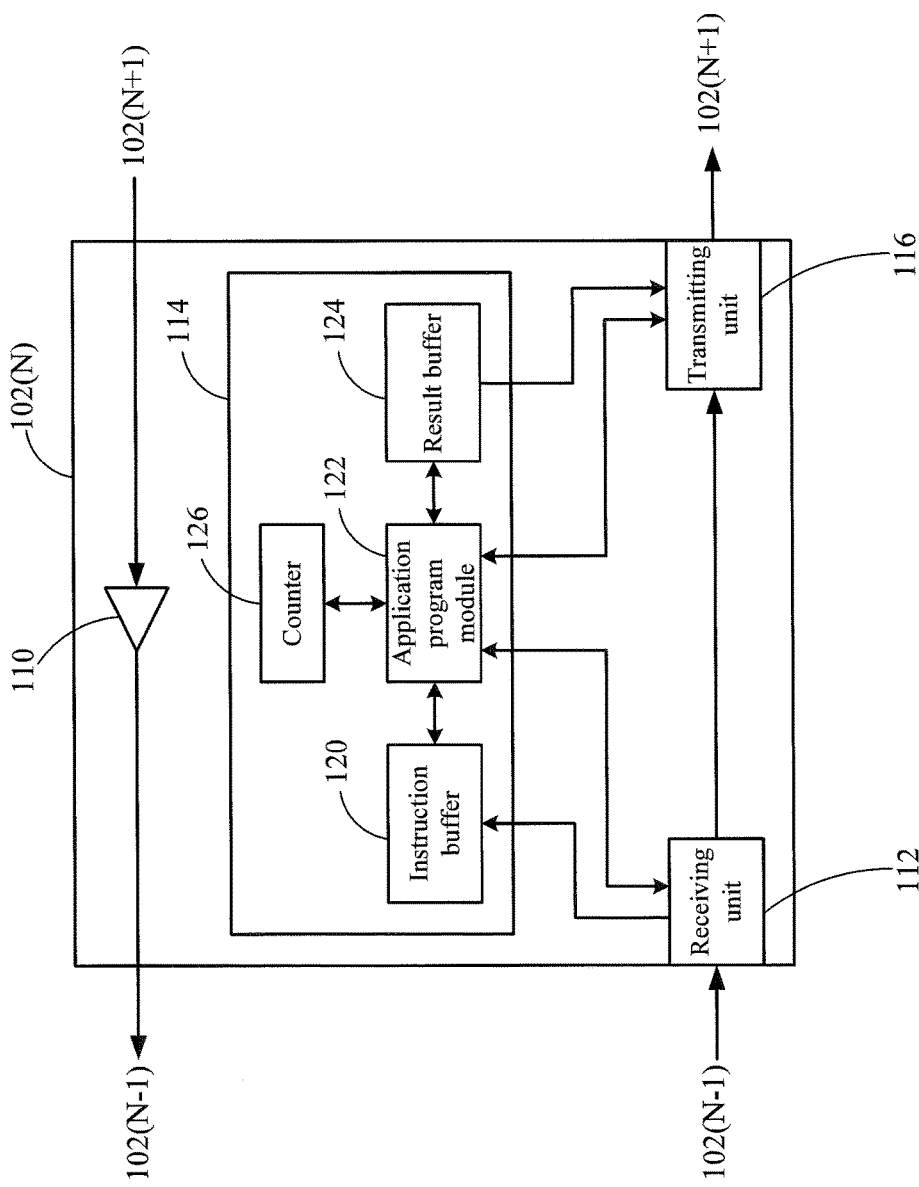
FIG. 3 is a schematic block diagram of exchanging and processing the data packets by a controlled module with a control unit according to one embodiment of the present invention.

Referring to FIG. 3, which is a schematic block diagram of exchanging and processing the data packets by the controlled module 102 with the control unit 114 according to one embodiment of the present invention. The control unit 114 further comprises an instruction buffer 120, an application program module 122, a result buffer 124 and a counter 126. The instruction buffer 120 connected to the receiving unit 112.

The application program module 122 connected to the instruction buffer 120 and the receiving unit 112 detects the first instruction packet string or the second instruction packet string. When an indication number of the instruction packet in the at least one of both first instruction packet string and the second instruction packet string corresponds to the current controlled module 102, the application program module 122 copies the indicated instruction packet to the instruction buffer 120 and replaces the indicated instruction packets in the first instruction packet string or the second instruction packet string by the first response packet with the same indication number. When the indication number of the instruction packets in the first instruction packet string or the second instruction packet string does not correspond to the current controlled module 102, the application program module 122 transmits the non-corresponding instruction packets forward to the receiving unit 112 of the next controlled module 102.

The result buffer 124 connected to the application program module 122 and the transmitting unit 116, and the application program module 122 acquires and processes the corresponding instruction packets within the instruction buffer 120 in a predetermined duration for forming the first response packets of the current controlled module 102 and for storing the first response packets in the result buffer 124.

Figure 4:
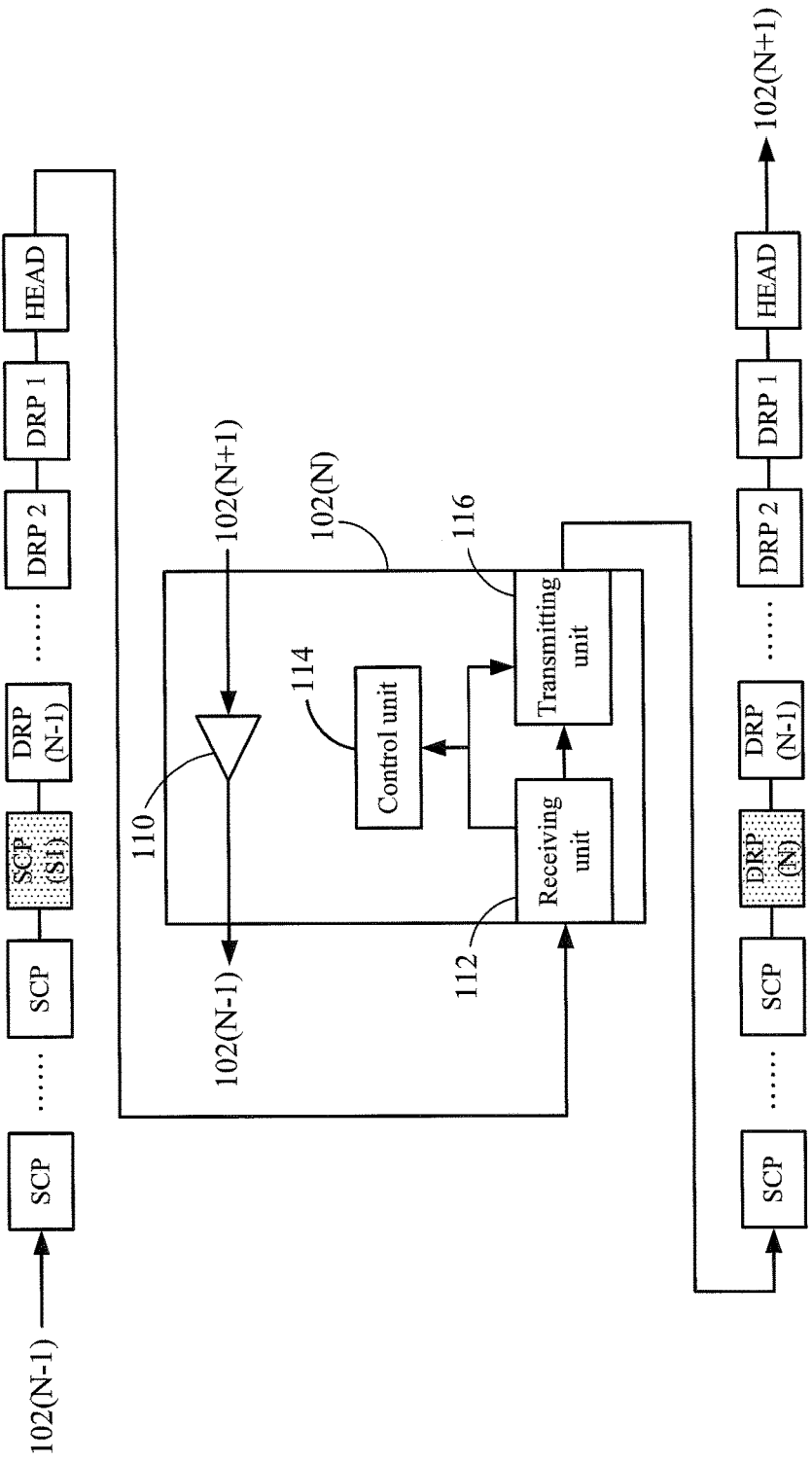
FIG. 4 is a schematic view of performing a sorting procedure and a detecting procedure of the controlled modules by using a serial detecting packet according to one embodiment of the present invention.

Referring to FIG. 2 through FIG. 4, FIG. 4 is a schematic view of performing a sorting procedure and a detecting procedure of the controlled modules 102 by using a serial detecting packet according to one embodiment of the present invention. The coupling device 100 transmits a first serial detecting packet via the first path CP1 and the first serial detecting packet comprises a head packet (HEAD) followed by a plurality of encoding packets (SCPs). When the controlled module 102, e.g. stage "N" in FIG. 4, receives or identifies the head packet of the first serial detecting packet, the counter 126 of the controlled module 102 counts the encoding packets in the first serial detecting packet until the controlled module 102 figures out the first one S1 of the encoding packets to allow the controlled module 102 to generate a counting number of the first encoding packet wherein the counting number represents a number of the controlled module 102. In one embodiment of FIG. 4, when the controlled module 102 (N) identifies the head packet "HEAD", the counter 126 counts encoding packets SCPs until the controlled module 102 (N) figures out the first SCP S1 to generate the counting number "N", i.e. next one of DRP (N−1). Thus, the counting number "N" represents an identification number of the controlled module 102. The controlled module 102 (N) replaces the first encoding packet S1 by a reporting packet "DRP N" for forming a second serial detecting packet and the second serial detecting packet is then transmitted to the terminal device 104. In FIG. 4, the reporting packets "DRP 1" through "DRP N" are generated by the controlled modules 102 (1) through 102 (N) respectively wherein the reporting packets "DRP 1" through "DRP N" represent the characteristics of the corresponding controlled modules 102 (1) through 102 (N) respectively. The coupling device 100 receives the second serial detecting packet outputted from the terminal device 104 to compute the amount of the at least one controlled module 102 and to identify the characteristics of the corresponding controlled modules 102 (1) through 102 (N). In one embodiment, the amount of the controlled modules 102 is equal to the difference value between the encoding packets SCPs of the first serial detecting packet in the first controlled module 102 (1) and the rest of encoding packets SCPs of the second serial detecting packet outputted from the last controlled module 102 (N).

According to above-mentioned descriptions, the present invention employs a communication system with the train bus architecture to economize the installation of the transmission units of the controlled module for saving the manufacturing cost of the communication system when the control unit of the controlled module controls the train bus architecture. Furthermore, the communication system with the train bus architecture employs the transmission time difference between the first path CP1 and the second path CP2 to increase the efficiency of the data transmission when the train bus architecture rapidly sends the instruction packets and response packets.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structure.

What is claimed is:

1. A communication system with train bus architecture, comprising:

a coupling device, for transmitting a first instruction packet string via a first path wherein the first instruction packet string comprises a plurality of instruction packets;

at least one controlled module connected to the coupling device, for receiving the first instruction packet string via the first path, wherein the at least one controlled module selects one instruction packet corresponding to the at least one controlled module from the instruction packets of the first instruction packet string, replaces the selected instruction packet by a first response packet in the at least one controlled module for forming a second instruction packet string, and processes the selected instruction packet to generate a second response packet; and a terminal device connected to the at least one controlled module, for receiving the second instruction packet string comprising the first response packet, the second response packet, and/or the instruction packets which does not correspond to the at least one controlled module via the first path from the coupling device to the terminal device, and for transmitting the second instruction packet string back to the coupling device via the at least one controlled module along a second path from the terminal device to the coupling device, wherein the first path is connected to the second path to form the train bus architecture;

wherein a transmission time of the first instruction packet string from the coupling device to the terminal device via the first path is greater than a transmission time of the second instruction packet string from the terminal device to the coupling device via the second path.

2. The communication system with the train bus architecture of claim 1, wherein the coupling device comprises:

a transmitting interface, for transmitting the first instruction packet string to the at least one controlled module via the first path; and a host connected to the transmitting interface, for receiving the second instruction packet string from the at least one controlled module via the second path.

3. The communication system with the train bus architecture of claim 1, wherein the at least one controlled module is composed of a plurality of controlled modules and each of the controlled modules comprises:

a receiving unit connected to the coupling device, for receiving the first instruction packet string of the coupling device via the first path;

a control unit connected to the receiving unit, for replacing the selected instruction packet corresponding to the controlled module by the first response packet;

a transmitting unit connected to the control unit of the controlled module and the receiving unit of a next controlled module respectively, for transmitting the second instruction packet string from the controlled module to the next controlled module via the first path; and a first buffer connected to the next controlled module and the coupling device, for storing the second instruction packet string from the terminal device via the second path.

4. The communication system with the train bus architecture of claim 1, wherein the at least one controlled module is composed of a plurality of controlled modules and each controlled module comprises:

a receiving unit connected to a prior controlled module, for receiving the second instruction packet string of the prior controlled module via the first path;

a control unit connected to the receiving unit, for replacing the selected instruction packet corresponding to a current controlled module by the first response packet;

a transmitting unit connected to the control unit of the current controlled module and the receiving unit of a next controlled module respectively, for transmitting the second instruction packet string from the current controlled module to the next controlled module via the first path; and a first buffer connected to the next controlled module and the prior controlled module, for storing the second instruction packet string from the terminal device via the second path.

5. The communication system with the train bus architecture of claim 4, wherein the terminal device receives each first response packet of each controlled modules via the first path and the coupling device receives the second instruction packet string with the first response packets of each controlled module from the terminal device via the second path.

6. The communication system with the train bus architecture of claim 4, wherein the control unit further comprises:

an instruction buffer connected to the receiving unit in the current controlled module; and an application program module connected to the instruction buffer and the receiving unit, for detecting the first instruction packet string or the second instruction packet string, wherein when an indication number of the instruction packet in the first instruction packet string or the second instruction packet string corresponds to the current controlled module, the application program module copies the indicated instruction packet to the instruction buffer and replaces the indicated instruction packets in the first instruction packet string or the second instruction packet string by the first response packet with the indication number.

7. The communication system with the train bus architecture of claim 6, wherein when the indication number of the instruction packet in the first instruction packet string or the second instruction packet string does not correspond to the current controlled module, the application program module transmits the non-corresponding instruction packets forward to the receiving unit of the next controlled module.

8. The communication system with the train bus architecture of claim 6, wherein the control unit further comprises a result buffer connected to the application program module and the transmitting unit in the current controlled module, the application program module acquires and processes the corresponding instruction packets within the instruction buffer in a predetermined duration for forming the first response packet of the current controlled module and for storing the first response packets in the result buffer.

9. The communication system with the train bus architecture of claim 1, wherein the at least one controlled module is composed of a plurality of controlled modules and each of the controlled modules comprises:

a receiving unit connected to a prior controlled module, for receiving the second instruction packet string of the prior controlled module via the first path;

a control unit connected to the receiving unit, for replacing the selected instruction packet corresponding to the controlled module by the first response packet;

a transmitting unit connected to the control unit of the current controlled module and the terminal device respectively, for transmitting the second instruction packet string from the controlled module to the terminal device via the first path; and a first buffer connected to the terminal device and the prior controlled module, for storing the second instruction packet string from the terminal device via the second path.

10. The communication system with the train bus architecture of claim 1, wherein the terminal device comprises a second buffer for storing the first response packets of the second instruction packet string from the at least one controlled module.

11. The communication system with the train bus architecture of claim 1, wherein the coupling device transmits a first serial detecting packet via the first path and the first serial detecting packet comprises a head packet followed by a plurality of encoding packets.

12. The communication system with the train bus architecture of claim 11, wherein when the controlled module identifies the head packet of the first serial detecting packet, a counter of the controlled module is capable of counting the packets in the first serial detecting packet until the controlled module figures out a position of the first encoding packet to allow the controlled module to generate a counting number of the first encoding packet and the counting number represents a number of the controlled module.

13. The communication system with the train bus architecture of claim 12, wherein the at least one controlled module replaces the first encoding packet by a reporting packet for forming a second serial detecting packet and the second serial detecting packet is transmitted to the terminal device.

14. The communication system with the train bus architecture of claim 13, wherein the coupling device receives the second serial detecting packet from the terminal device to compute an amount of the at least one controlled module and to identify a characteristic of the controlled module based on the reporting packet.

* * * * *